US005487010A

United States Patent [19]

[11] Patent Number: 5,487,010

[45] Date of Patent: Jan. 23, 1996

Drake et al.

[54] BUMPER STICKER PRINTING MACHINE

[75] Inventors: Charles S. Drake, Norcross, Ga.; Bernhard O. Williams, Elmhurst, Ill.; Adrian T. Dombrowski, Remington, Ind.; Athur R. Harth, Chicago, Ill.

[73] Assignee: B.M.D., Inc., Norcross, Ga.

[21] Appl. No.: 81,116

[22] Filed: Jun. 25, 1993

[51] Int. Cl.$^{6}$ .................... G06F 17/60

[52] U.S. Cl. .................... 364/479; 364/401

[58] Field of Search .................... 364/400, 401, 364/468, 479; 235/375, 381; 312/215, 223.2, 223.3; 407/120; 83/602; 271/3

[56] References Cited

U.S. PATENT DOCUMENTS

| | | | |
|---|---|---|---|
| 4,344,660 | 8/1982 | Molnar et al. | 312/250 |
| 4,384,500 | 5/1983 | Friberg | 83/74 |
| 4,491,046 | 1/1985 | Hosogaya | 83/589 |
| 4,616,327 | 10/1986 | Rosewarne et al. | 395/135 |
| 4,677,565 | 6/1987 | Ogaki et al. | 364/479 |
| 4,799,172 | 1/1989 | Wood et al. | 395/103 |
| 4,807,177 | 2/1989 | Ward | 395/117 |
| 4,817,043 | 3/1989 | Brown | 346/154 X |
| 4,818,854 | 4/1989 | Davies et al. | 235/381 |
| 4,873,643 | 10/1989 | Powell et al. | 364/468 |
| 4,928,229 | 5/1990 | Teraoka et al. | 364/464.01 |
| 5,029,099 | 7/1991 | Goodman | 364/479 |
| 5,036,472 | 7/1991 | Buckley et al. | 364/479 |
| 5,038,293 | 8/1991 | Goodman | 364/479 |
| 5,039,848 | 8/1991 | Stoken | 235/381 |
| 5,132,915 | 7/1992 | Goodman | 364/479 |

OTHER PUBLICATIONS

*PR Newswire,* Nov. 8, 1990, "New high-tech greeting card system offers advanced design".

*PTS Prompt News Release,* May 8, 1987, "Electronic Arts Announces [Deluxe Library]of Color Clip-Art Disks for Apple IIGS".

Newsbytes News Network, Sep. 26, 1990, PTS Prompt, "New for MacIntosh: Bannermania From Broderband".

*Primary Examiner*—David M. Huntley

*Attorney, Agent, or Firm*—Patula & Associates

[57] ABSTRACT

A bumper sticker printing machine having an arcade-style enclosure, a computer board and program, a monitor and touch screen, a vinyl bumper sticker stock, a vinyl bumper sticker feed mechanism, and a printer. A customer puts money into the machine and then selects a pre-printed message or creates an original message through the use of the touch screen. The machine then prints out the message on a bumper sticker and dispenses the bumper sticker to the customer.

20 Claims, 5 Drawing Sheets

BUMPER STICKER PRINTING MACHINE

BACKGROUND OF THE INVENTION

Bumper stickers have long been used by people for many different purposes. For example, people have used bumper stickers for advertisements, promotions and political campaigns. People also use bumper stickers to display witty or funny sayings or to express themselves or make a statement, etc. Bumper stickers are traditionally displayed on car bumpers. However, bumper stickers can be placed almost anywhere, for example on walls, suitcases, school lockers, etc.

Commonly, bumper stickers are pre-printed by companies and are then delivered to stores for sale. This, however, presents several problems. Typically, bumper stickers are bought on a whim, for example by someone passing by a display stand and reading one that catches their eye. Most people rarely go to a store with the specific intent to buy a bumper sticker. Therefore, selling bumper stickers in a store can result in poor sales.

Another problem with bumper stickers produced by companies for sale in stores is that they display only pre-printed messages. If potential customers don't see any they like, they have no other choice but to not buy any of the bumper stickers. If a person wants to buy a bumper sticker with a personal message on it, they would have to have it custom made at a substantial cost, assuming they could even find a company that would make it for them. A large quantity minimum is usually required as well.

The present invention solves the aforementioned problems in that the invention is used directly by a customer who interacts with the machine and creates a bumper sticker with any message that the customer desires. Further, the invention can be placed in virtually any location where people may pass by, catching their attention, resulting in increased bumper sticker sales. There is also no need to have the machine be attended by a salesperson or such.

BRIEF SUMMARY OF THE INVENTION

The invention consists of a bumper sticker printing machine, self-contained in an enclosure resembling an arcade game shell. The machine is comprised of essentially eight component parts: a computer board and program, a bumper sticker stock (preferably vinyl), a sticker stock feed mechanism, a printer, a cutter, a drop chute, a dollar bill acceptor or other money collecting unit, and a touch screen or other means for interacting such as a keyboard. These component parts are interrelated via a wiring harness and their respective power supplies as needed.

In use, a person sees the machine and is attracted to its touch screen. The person then watches the screen and inserts a specific amount of money as required to pay for the desired bumper sticker. Then, through interaction with a user-friendly touch screen, the person either selects a pre-programmed message or creates an original message. The machine then prints the message on a vinyl bumper sticker and the bumper sticker then exits the machine to the customer.

It is the principle object of the present invention to provide means for creating bumper stickers on the whim by the end user.

It is a further object of the invention to provide a bumper sticker printing machine that is self-contained.

It is also an object of the invention to provide a bumper sticker printing machine that can be placed in any desired location where people pass by.

It is an additional object of the invention to teach a simple and novel method of printing any desired message on a bumper sticker.

It is another object of the invention to teach a novel bumper sticker printing machine that allows a person to create a desired bumper sticker in an efficient, inexpensive, and non-time consuming way.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein.

DETAILED DESCRIPTION OF THE PREFERRED EMBODIMENT OF THE PRESENT INVENTION

Figure 1:
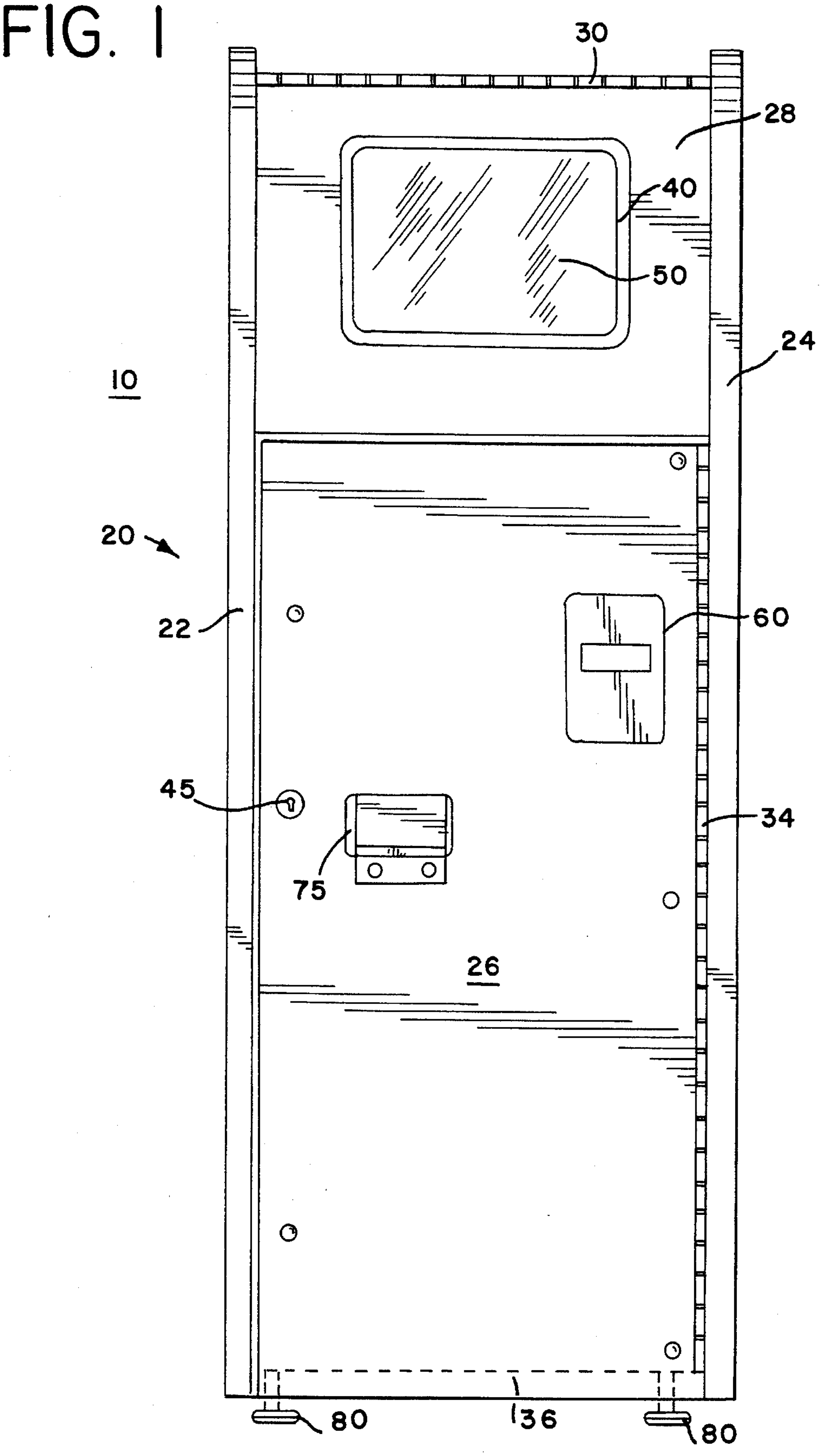
FIG. 1 is a front view of the preferred embodiment of the present invention.

While the invention is susceptible of embodiment in many different forms there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

FIGS. 1–5 illustrate the present invention 10 comprising an outer enclosure or encasement 20 similar to that of an arcade game. Inside the enclosure, near the bottom of the left wall, is mounted a conventional computer board. Operatively connected with the computer board is a monitor 48 having a touch screen 50 which allows interaction between the invention 10 and a customer. Directly below the monitor 48 is mounted a printer 100 for printing a slogan on a sticker. Below the printer 100 is mounted a bumper sticker stock 110, preferably vinyl but the stock could consist of some other printing material, and feed mechanism 120. The vinyl bumper sticker stock 110 is fed up to the printer 100 by the feed mechanism 120. Attached to the printer 100 is a plate guide 130, sensor 135 and cutter 140 which will be described in detail below. Directly in front of the printer 100 is mounted a drop chute 70 which allows the printed sticker to exit the machine to the customer. On the front of the machine is mounted a bill collector unit 60 to accept dollar bills from a customer. It should be understood that any type of money collector unit may be used such as the units used in conventional vending machines. Also on the front of the machine is a tray 75 for receiving the bumper sticker from the drop chute 70. Finally, the front wall 26 of the encasement 20 is hinged on one side and is openable to allow access to the components of the machine inside the encasement 10. A lock 45 is provided to securely lock the front wall 26 of the machine to prevent unauthorized access to the inside of the machine.

FIG. 1 shows a front view of invention 10 containing encasement indicated generally by reference number 20. As seen in FIG. 1, encasement 20 consists of side walls 22, 24 and front wall 26. Encasement 20 also consists of monitor panel 28. Monitor panel 28 contains opening 40 that allows access to the touch screen 50. Monitor panel 28 is hinged at panel hinge 30 to top wall 32 of encasement 20. Monitor pane]. 28 also contains locking flange 42 (FIG. 2) which extends downward behind front wall 26, thereby preventing monitor panel 28 from rotating about panel hinge 30 when front wall 26 is in its locked position.

Also seen in FIG. 1 is front wall door hinge 34 which allows front wall 26 to swing into an opened position. Front wall 26 may be locked into a closed position by barrel lock 45 or any other conventional locking means. Mounted in front wall 26 is a bill collector unit 60 which will be more fully described below. Also mounted to front wall 26 is a tray 75, positioned under a drop chute 70, for receiving a printed bumper sticker. The machine is supported at the bottom of the encasement by support members 80. Support members 80 may be any suitable supports such as adjustable legs and are attached to a bottom wall 36 of encasement 20.

Figure 2:
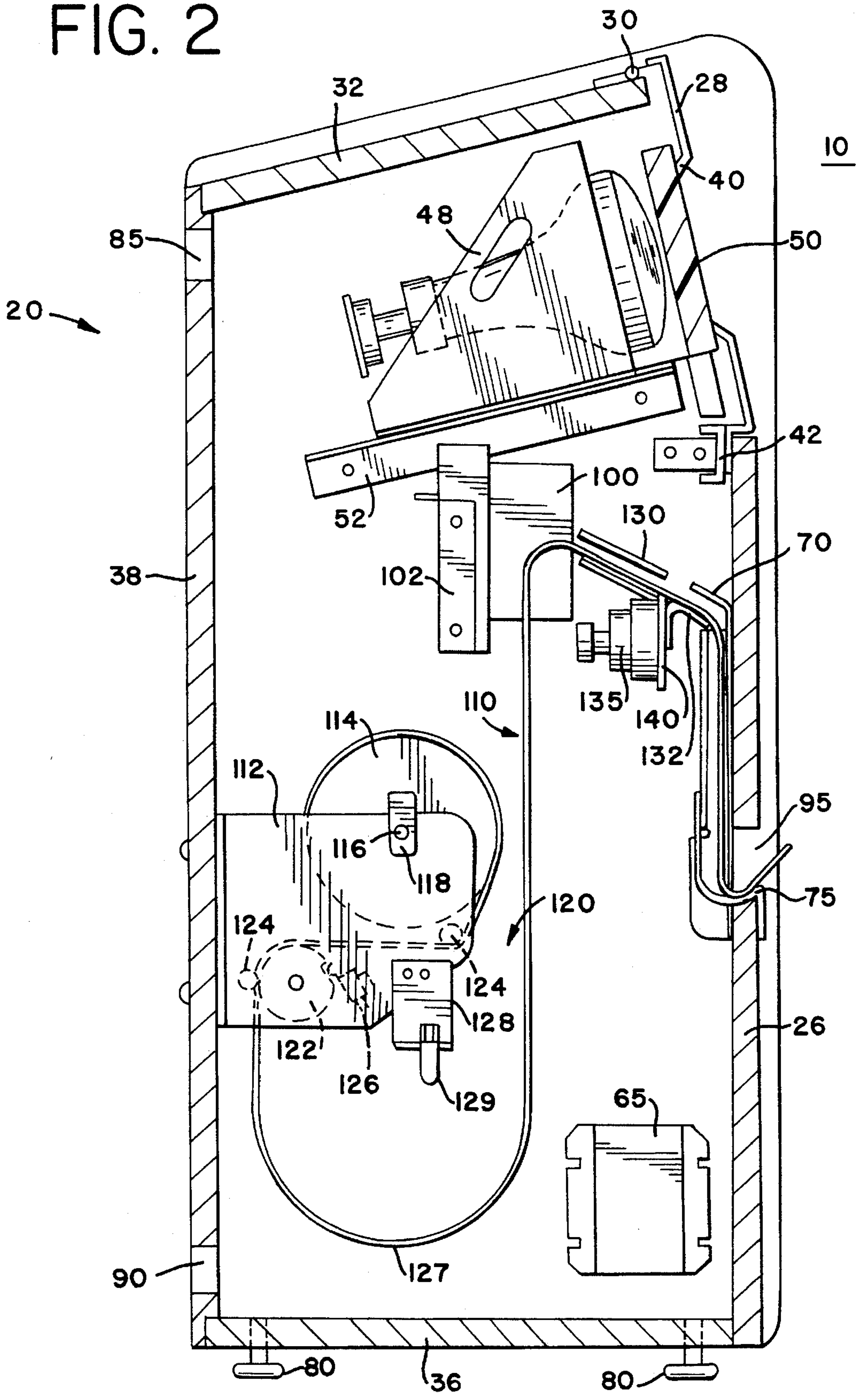
FIG. 2 is a cross-sectional side view of the present invention of FIG. 1.

FIG. 2 shows a cross-sectional side view of the invention 10 having front wall 26, top wall 32, bottom wall 36, and a back wall 38. Panel hinge 30 is attached to top wall 32. Attached to panel hinge 30 is monitor panel 28 having opening 40 and locking flange 42.

Attached to bottom flange 36 are support members 80. Back wall 38 has an opening 85 for providing ventilation to the inside components of the invention. Back wall 38 further has an opening 90 for a power supply line cord or cords.

Inside of encasement 20, monitor 48 having touch screen 50 is mounted via mounting block 52. Mounting block 52 is fastened in any suitable manner to encasement 20. Mounted under monitor 48 via mounting block 102 is printer 100. Mounting block 102 is fastened in any suitable manner to encasement 20. Below printer 100 is mounted a vinyl bumper sticker stock 110 via mounting block 112. Also mounted on mounting block 112 is a feed mechanism 120. Mounting block 112 is fastened in any suitable manner to back wall 38.

Also shown in FIG. 2 is drop chute 70 mounted in front of printer 100. At the bottom of drop chute 70 is tray 75. Front wall 26 has opening 95 at tray 75 to allow for the exit of printed bumper stickers. Bill collector unit controller 65 is shown near the bottom of the invention 10.

Referring now to the individual components of the invention in more detail, a bumper sticker stock 110 is supplied to the machine, preferably in the form of a five hundred foot vinyl roll which is three and three quarters inches wide. The roll contains a three inch diameter core made of heavy cardboard. The vinyl stock 110 is coated with a suitable chemical that enables the printer ribbon ink to be absorbed and to adhere to the vinyl.

The vinyl stock must also receive a flood coating of computer imprintable colored ink in order to tone down the absorbency of the chemical. The flood coating of ink and the chemical coating provide the right combination for the sticker to absorb the ink and have it virtually dry to the touch just a few seconds after printing. The flood coating further provides the ability to offer various colors of vinyl stock 110 to be supplied to the machine.

The vinyl stock 110 further consists of an adhesive on a back side of the vinyl stock 110 covered by a paper backing. On the paper backing of the vinyl stock 110, a cut is made through the paper backing only, to provide the customer with the ability to "crack-and-peel" the backing paper off for easy access to the adhesive. This cut is a continuous cut through the entire length of the roll, preferably approximately one and one quarter inches from the top of the sticker.

Printed equally spaced apart, preferably every thirteen inches, on the paper backing of the vinyl stock 110 are identifiable hash marks 160. These marks provide a reading point for the sensor to know when and where to cut the vinyl. Additionally, instructions to the customers may be printed on the paper backing for describing drying time, peeling instructions, etc. On the front side of the vinyl stock 110, a logo along the top and bottom face of the sticker is printed to provide a boarder and an identifiable trademark.

Referring now to the vinyl feed mechanism 120, a free end of the vinyl stock 110 is pulled through the printer 100 by typical rubber pinch rollers, or other conventional material pinch rollers incorporated in the printer 100 itself. However, the vinyl is first pulled down through a system of pre-feeding it in a loop fashion to allow the vinyl to hang free prior to being pulled through the printer. This is necessary to prevent drag during the printing process which could result in improperly printed stickers or sticker jams.

The rolled vinyl stock 110 is attached on a spindle which preferably consists of a three inch wooden dowel that fits snugly inside the cardboard core of the vinyl roll. The dowel could be any size or material to cooperate with any sized core of the roll. Round metal plates 114 provide side support for the vinyl roll. Attached to the center of these plates 114 are pins 116, preferably one quarter inch in diameter, to allow the entire system to be placed on metal holder 118 and to roll freely. The roll is held in place on a metal holder 118 by gravity.

The vinyl is fed through a pinch roller 122, preferably three inches wide, and associated guide rollers 124. This is accomplished by pulling back on a spring loaded lever 126 which releases the rollers so that the vinyl will drop freely therethrough. The vinyl is then looped at 127 before being fed up to the printer 100.

The pinch roller 122 is motorized and connected to a switch 128. The switch consists of an arm 129 which extends out from the switch 128 and into the free hanging loop 127 of vinyl. As the printer pulls the vinyl through for printing, the loop 127 shortens and eventually pulls up the arm 129 to a point where it trips the switch and the pre-feed motor is engaged. The motor runs for approximately four seconds, rotating pinch roller 122 and causing the vinyl to be pulled off the roll of vinyl stock 110, forming a new, larger loop.

Figure 5:
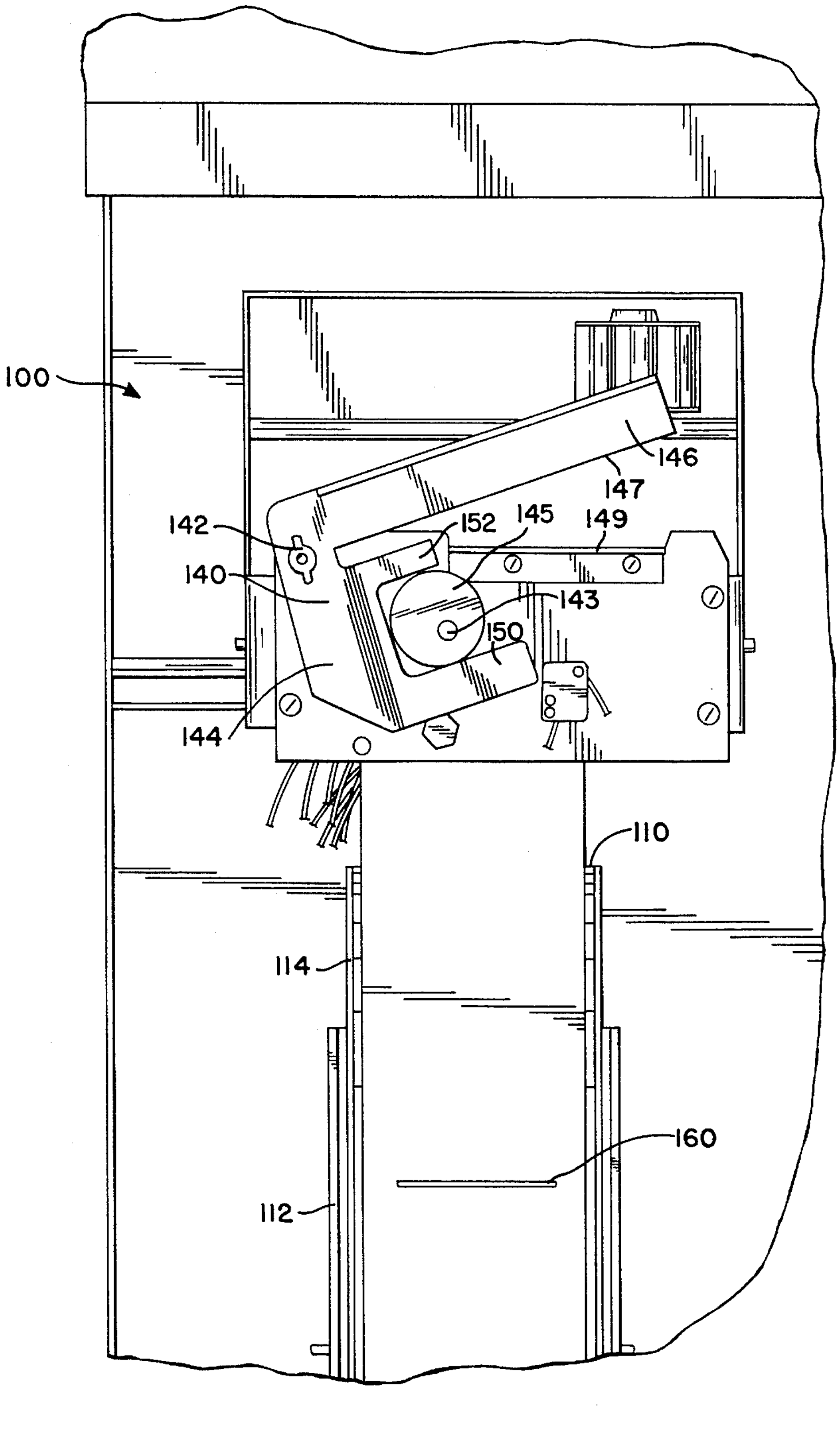
FIG. 5 is a front view of the printing means of the present invention.

Referring now to the printer 100 and in particular FIGS. 2 and 5, any suitable, conventional printer such as a printer manufactured by Singer Data Products of Bensenville, Ill. may be used. For the sake of illustration, the printer contains such features as a continuous duty print head, modular replacement of specific electronic functions, full graphics capability, and a long life cartridge ribbon. The printer 100 is preferably a heavy duty dot matrix printer.

Mounted to the front of the printer 100 by any suitable means are a plate guide 130, an electronic sensor 135 or other sensing means, and a motorized cutter 140. The printed bumper stickers leave the printer 100 through. plate guide 130 until the hash mark on the paper backing of vinyl stock 110 is sensed electronically by sensor 135. The detection of the hash marks triggers the motor of the cutter 140 to rotate a cam 145, which produces a camming action on the cutter blade 147. The blade 147 is rotated down over a second blade 149, thereby cutting the bumper sticker from the rest of the vinyl stock 110.

The cutter 140 is mounted to the front of the printer by pivot 142. Pivot 142 can be any conventional fastener such as a bolt and wing nut assembly. Cutter 140 is free to pivot about pivot 142. The cutter 140 consists of an integral cutting arm 146 and C-shaped cam receiver 144. Cam 145 sits in the C-shaped cam receiver 144. Cam 145 is attached to a cam axle 143 which is connected to a motor. Cam 145 is mounted off center on cam axle 143 such that when the motor rotates cam axle 143, the cam 145 rotates to produce the desired camming action. As cam 145 rotates about cam axle 143, cam 145 first pushes downward on the first arm 150 of C-shaped cam receiver 144. The force on first arm 150 causes cutter 140 to pivot about pivot 142, bringing cutting arm 146 with blade 147 down into contact with second blade 149. As cam 145 continues to rotate, it next pushes upward on second arm 152 of C-shaped cam receiver 144. The force on second arm 152 causes cutter 140 to pivot about pivot 142, raising cutting arm 146 with blade 147 up and away from second blade 149. The cutter 140 is now ready to cut off the next bumper sticker upon sensing of the next hash mark 160.

After the vinyl bumper sticker is cut, it drops down chute 70 to tray 75 where it is able to be taken out through opening 95 in the front wall 26 of the machine. The chute 70 is designed so that a person operating the machine cannot reach up and pull the vinyl down prior to its finishing printing or being cut. A final, curved lip 132 at the end of the plate guide allows the vinyl to drop freely into the chute 70.

The computer board and program will next be described in detail. The board and its logic commands are designed to control all aspects of the machine. The computer board itself is an already manufactured "mother" board, commercially available, which is then modified or programmed to perform the necessary functions to integrate all of the separate systems of the invention. The board is provided with a reset switch in the case of an interrupt on the board's normal functions.

The computer program consists of several different screens which are displayed on monitor 48. A manager's interface screen can be accessed by the manager or person in charge of overseeing the operation of the machine. This screen allows the manager to program the desired settings and to make modifications thereto. There are four controls present on the manager's interface screen. The first control is the "Set Time Outs" control. This control lets the manager set the "amount of time left" for a customer to make choices and print a sticker. The second control is the "Change Slogans" control. This control allows the manager to input or change any slogan into the list of ten existing slogans from which a customer may choose. The list of ten pre-programmed slogans are stored in conventional memory means associated with the computer board. The third control is the "Test Screen" control. This control allows the manager to run a "tracer" test to check to see if the coordinates of the touch screen 50 are accurate. The fourth and last control is the "Set Cost" control. This control allows the manager to set the price of a bumper sticker in increments of $1.00. If a more sophisticated money collector is being used, the price could be set to any desired amount.

Figure 3:
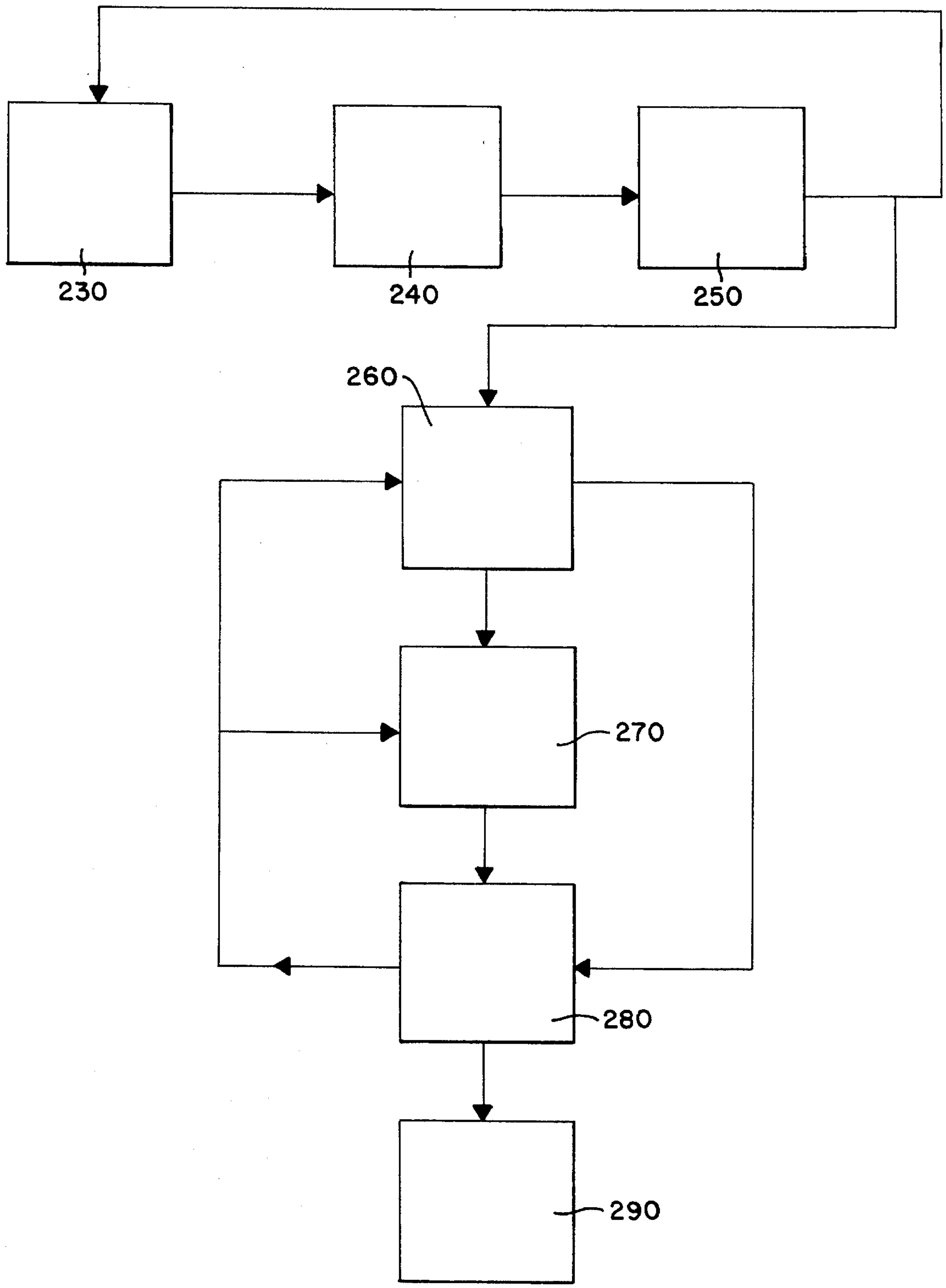
FIG. 3 is a schematic flow chart of the screens of the present invention.
Figure 4A:
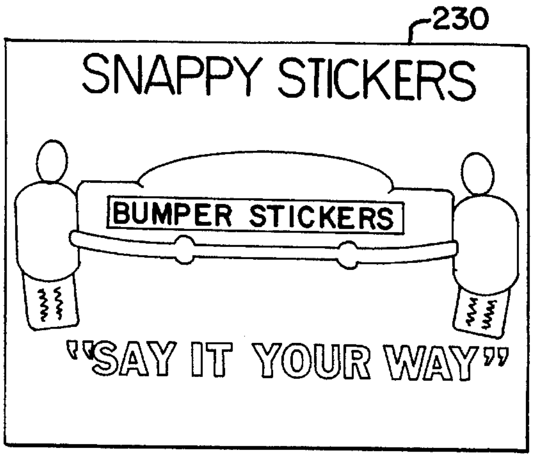
FIG. 4(*a*)–4(*e*) is a front view of the various screens of the present invention.
Figure 4B:
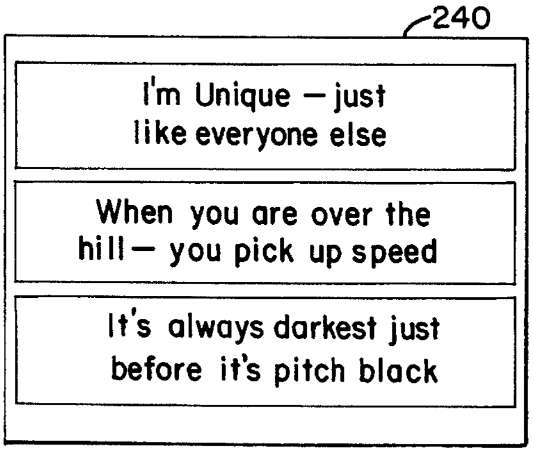
Figure 4C:
Figure 4D:
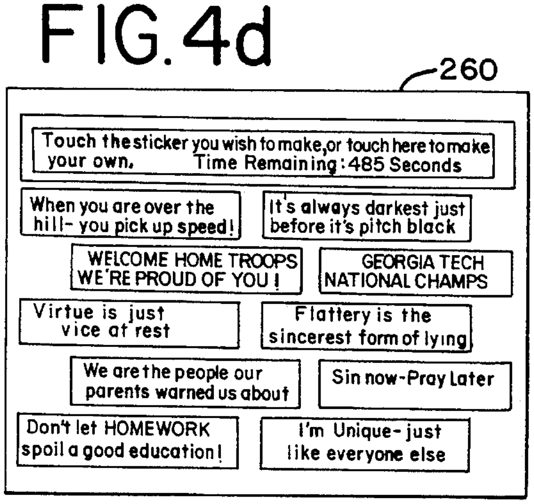
Figure 4E:
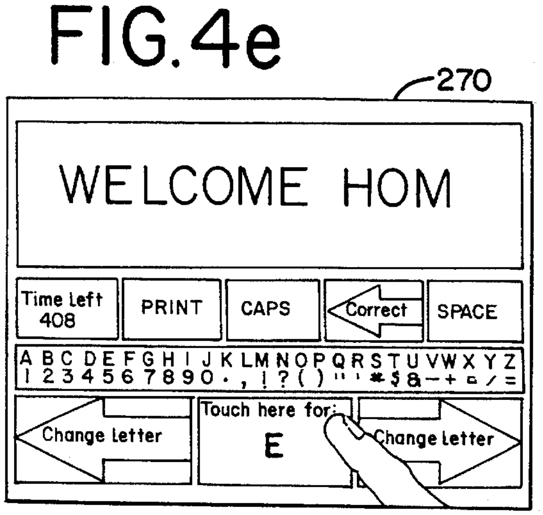
Figure 4F:
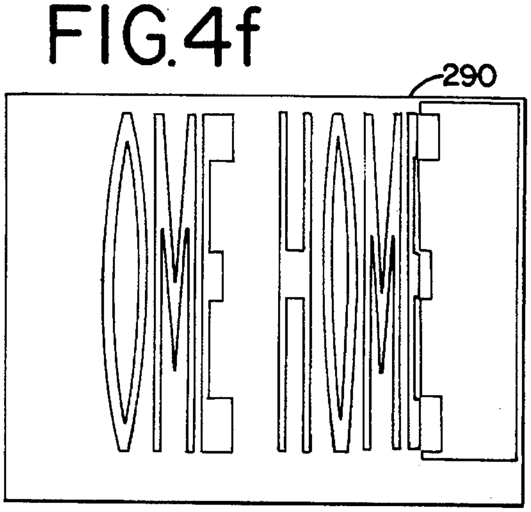

There are seven screens displayed on monitor 48 that a customer sees. FIG. 3 shows a flow chart of these seven customer screens. The first three screens are attract screens designed to catch the attention of a potential customer and create an interest in purchasing a bumper sticker (See FIG. 4(*a*)–4(*e*). The first attract screen 230 displays the "Snappy Stickers" logo and the front end of a car with headlights that blink. Optionally, an audio computer chip can sound a horn each time the lights blink. After approximately fifteen seconds, the screens switch and the monitor 48 now displays the second attract screen 240. Attract screen 240 displays three examples of pre-programmed slogans stored in memory. The three examples of pre-programmed slogans are randomly selected from the list of ten pre-programmed slogans stored in memory. The three examples change each time attract screen 240 appears on monitor 48. Again after approximately fifteen seconds, the screens switch and the monitor 48 now displays the third attract screen 250. Attract screen 250 displays the set cost of a bumper sticker and prompts the prospective customer to "Insert Your Money Now!" Attract screen 250 is displayed for approximately fifteen seconds and will then switch back to attract screen 230 to repeat the cycle again and again (as seen in FIG. 3).

When a customer inserts the correct amount of money, screen 260 will be displayed on the monitor 48. Screen 260 displays all ten pre-programmed slogans as well as an area to touch if the customer wants to create their own slogan. By touching one of the ten pre-programmed slogans on touch screen 50, the screens once again switch and screen 280 is displayed on the monitor 48. Screen 280 displays the question "Are You Sure?" along with a "yes" and a "no" box. If the customer touches the "yes" box on touch screen 50, the program moves to print screen 290 and the machine begins to print the bumper sticker with the desired slogan. If the customer touches the "no" box on touch screen 50, the program loops back to screen 260. The customer will again be able to choose from the ten pre-programmed slogans or to choose to create their own slogan. Once in screen 260, the customer will have a limited amount of time to make a choice. This amount of time is set by the manager and can be up to nine hundred and ninety-nine seconds. Screen 260 displays a timer showing the time remaining to make a choice. This timer is only related to screen 260.

When a customer touches the touch screen 50 in the area designated to make their own sticker, the program moves from screen 260 to screen 270. Screen 270 produces a facsimile of a blank sticker at the top of the screen 270. Below the facsimile is a timer box, a print box, a caps box, a correct box, and a space box. Below these boxes are rows of letters, numbers, and symbols which a customer may select to create a slogan. Below these rows are change letter boxes as well as a box displaying the current selection.

To create a slogan, the customer touches the left or right change letter box until the desired letter, number or symbol appears in the display box. When the desired letter, etc. is displayed, the customer touches the display box and the letter, etc. appears in the facsimile. This process continues until the customer completes the desired slogan. The customer can enter spaces between words by touching the space box. The customer may also use capital letters by touching the caps box and can make corrections by touching the correct box. The customer has a limited time in which to complete the desired slogan. The timer for screen 270 is set by the manager. The amount of time for this screen can be set up to nine hundred and ninety-nine minutes. The time remaining is displayed in the timer box. Installed within the program is an elimination of certain words which would be considered objectionable or profane. A list of objectionable words are stored in memory and the customer's words are compared to this list. If a match is found, the customer will not be allowed to print those words.

When the customer touches the print box, the program moves to screen 280, asking the customer "Are You Sure?" If the customer touches "no", the program returns to screen 270. If the customer touches "yes", the program moves to print screen 290. As the sticker is being printed, print screen 290 displays the created slogan at the point at which the printer head is printing. After printing is complete, the program returns to attract screens 230, 240, and 250 to allow another customer to purchase a sticker.

It is to be understood that the embodiments herein described are merely illustrative of the principles of the present invention. Various modifications may be made by those skilled in the art without departing from the spirit or scope of the claims which follow.

I claim:

1. A machine for printing user-selected bumper stickers comprising:

encasement means for enclosing and supporting components of said machine;

a synthetic bumper sticker stock mounted in said encasement means;

means for printing words onto said bumper sticker stock mounted in said encasement means;

means for feeding said bumper sticker stock to said means for printing mounted in said encasement;

means for cutting said bumper sticker stock mounted in said encasement means;

computer means for generating visual screens mounted in said encasement means;

memory means for storing information operatively associated with said computer means;

monitor means for displaying said visual screens operatively connected to said computer means; and means for interacting between said machine and a user for receiving a user input as prompted by said visual screens displayed on said monitor means, said means for interacting operatively connected to said computer means, said computer means processing said user input via said memory means and signaling said means for printing;

said means for feeding comprising a motorized pinch roller, associated guide rollers mounted proximate said pinch roller, a spring loaded lever cooperatively associated with said pinch roller, and a switch for activating said pinch roller.

2. The machine of claim 11, wherein said machine further comprises collecting means mounted to said encasement means for accepting money from a user; and means for controlling said collecting means operatively connected to said computer means.

3. The machine of claim 11, wherein said encasement means comprises two side walls attached to a front wall, a back wall, a top wall, a bottom wall, and a monitor panel.

4. The machine of claim 3, wherein said monitor panel covers said monitor means and said means for interacting; said monitor panel comprising an opening for allowing access to said means for interacting; said monitor panel further comprising a locking flange extending downward behind said front wall.

5. The machine of claim 4, wherein said monitor panel is pivotally mounted to said top wall by a panel hinge; and said front wall is pivotally mounted to a side wall by a door hinge.

6. The machine of claim 5, wherein said front wall contains a lock for locking said front wall in a closed position; said front wall pivotable about said door hinge to an opened position when said lock is unlocked.

7. The machine of claim 6, wherein said locking flange prevents said monitor panel from pivoting about said panel flange when said front wall is in said closed position.

8. The machine of claim 1, wherein said means for printing comprises a printer; said printer having attached thereto a sensor, said means for cutting, and a plate guide.

9. The machine of claim 8 wherein said bumper sticker stock includes a paper backing having at least one hash mark, said sensor being capable of detecting said hash mark, said means for cutting being operated via a motorized cam to cut said bumper sticker stock upon detection of said hash mark.

10. The machine of claim 9, wherein said plate guide includes a curved lip at an end of said plate guide; said machine further comprising a drop chute mounted in said encasement means, a tray at the bottom of said drop chute, and an opening in a front wall of said encasement means.

11. The machine of claim 1, wherein said bumper sticker stock hangs freely in a loop. between said pinch roller and said means for printing, prior to printing.

12. The machine of claim 11, wherein said bumper sticker stock is pulled through said means for printing by said means for printing during printing, said loop contracts and contacts an arm of said switch, said arm being raised by the contracting loop and contacting said switch, thereby operating said motorized pinch roller to create a new loop.

13. The machine of claim 1, wherein said means for interacting comprises a touch screen.

14. The machine of claim 13, wherein said visual screens of said computer means appear on said touch. screen, said touch screen being selectively touched at a desired location of the visual screen to print a preprogrammed message on said bumper sticker stock.

15. The machine of claim 13, wherein said visual screens of said computer means appear on said touch screen, said touch screen being selectively touched at a desired location of the visual screen to print a user-created message on said bumper sticker stock.

16. The machine of claim 13, wherein said visual screens of said computer means appear on said touch screen and display a plurality of symbols and at least one change letter box, said touch screen being selectively touched at said at least one change letter box of the visual screen to create a message to be printed on said bumper sticker stock.

17. The machine of claim 1, wherein said memory means stores a plurality of pre-programmed slogans and a list of objectional words.

18. A bumper sticker printing machine for printing bumper stickers selected by a user through interaction with said machine, said machine comprising:

a machine housing;

a synthetic bumper sticker stock mounted in said housing;

interaction means for allowing said user to design said bumper stickers, said interaction means mounted in said housing;

means for printing mounted in said housing, said means for printing including means for pulling said bumper sticker stock therethrough during printing; and a feed mechanism for forming a free hanging loop in said bumper sticker stock between said stock and said means for printing, said feed mechanism including a motorized pinch roller, associated guide rollers mounted proximate said pinch roller, a spring loaded lever cooperatively associated with said pinch roller, and a switch for activating said pinch roller, said means for pulling contracting said loop during printing, the contracting loop contacts and raises an arm of said switch to engage said switch, thereby operating said motorized pinch roller to create a new loop.

19. The machine of claim 1, wherein said means for cutting comprises a cutter, and a cam, said cutter having a cutting arm with a first blade and a C-shaped cam receiver.

20. The machine of claim 19, wherein said cam is mounted off center to a cam axle such that when a motor rotates said cam axle, said cam causes said cutter to pivot about a pivot member, to move said blade in and out of contact with a second blade.

* * * * *